(12) United States Patent
Versteegh

(10) Patent No.: US 9,062,652 B2
(45) Date of Patent: *Jun. 23, 2015

(54) WIND TURBINE AND A DIRECT-DRIVE GENERATOR

(75) Inventor: Cornelis Johannes Antonius Versteegh, Hilversum (NL)

(73) Assignee: XEMC Darwind B.V., Hilversum (NL)

( * ) Notice: Subject to any disclaimer, the term of this patent is extended or adjusted under 35 U.S.C. 154(b) by 10 days.

This patent is subject to a terminal disclaimer.

(21) Appl. No.: 13/257,021

(22) PCT Filed: Mar. 19, 2010

(86) PCT No.: PCT/NL2010/000048
§ 371 (c)(1),
(2), (4) Date: Nov. 15, 2011

(87) PCT Pub. No.: WO2010/107305
PCT Pub. Date: Sep. 23, 2010

(65) Prior Publication Data
US 2012/0056435 A1    Mar. 8, 2012

(30) Foreign Application Priority Data

Mar. 19, 2009   (NL) .................................... 1036733

(51) Int. Cl.
*F03D 9/00*    (2006.01)
*F03D 7/02*    (2006.01)
(Continued)

(52) U.S. Cl.
CPC .............. *F03D 7/0248* (2013.01); *F03D 9/002* (2013.01); *F05B 2220/7066* (2013.01);
(Continued)

(58) Field of Classification Search
CPC ......... Y02E 10/725; H02K 9/22; H02K 1/148

USPC ................................... 290/44, 55; 310/52, 64
See application file for complete search history.

(56) References Cited

U.S. PATENT DOCUMENTS 5,877,576 A * 3/1999 CoChimin .................... 310/418
6,467,725 B1   10/2002 Coles
(Continued)

FOREIGN PATENT DOCUMENTS

CN    101222159    7/2008
DE    1808577      8/1969
(Continued)

OTHER PUBLICATIONS

Official Search Report and Written Opinion of the European Patent Office in counterpart foreign application No. PCT/NL2010/0000048 filed Mar. 19, 2010.
(Continued)

*Primary Examiner* — Tulsidas C Patel
*Assistant Examiner* — Sean Gugger
(74) *Attorney, Agent, or Firm* — Steven M. Koehler; Westman, Champlin & Koehler, P.A.

(57) ABSTRACT

A wind turbine of the horizontal axis, direct-drive type, comprises a hub provided with one or more blades, a generator with a centerline that is technically horizontal, the generator comprising an inner rotor which is driven by the hub and an outer stator, the stator comprising a front plate, a back plate and stacked, arcuate laminates. The front plate and the back plate are connected by tension rods so as to form a stator unit with the stacked, arcuate laminates being sandwiched between the back plate and the front-plate under compression, the arcuate laminates having protrusions over the circumference of the stator for dissipating heat to the atmosphere. The invention also relates to a direct-drive generator.

17 Claims, 3 Drawing Sheets

(51) Int. Cl.
  *H02K 1/20* (2006.01)
  *H02K 7/18* (2006.01)
  *H02K 1/18* (2006.01)
  *H02K 9/02* (2006.01)
  *H02K 9/14* (2006.01)

(52) U.S. Cl.
  CPC ............... *H02K 1/185* (2013.01); *H02K 1/20* (2013.01); *H02K 9/02* (2013.01); *H02K 9/14* (2013.01); *Y02E 10/725* (2013.01); *H02K 7/1838* (2013.01); *Y02E 10/723* (2013.01)

(56) References Cited

U.S. PATENT DOCUMENTS

| | | | |
|---|---|---|---|
| 7,431,567 | B1 | 10/2008 | Bevington |
| 2001/0035651 | A1 | 11/2001 | Umemoto |
| 2004/0179934 | A1 | 9/2004 | Wobben |
| 2006/0066110 | A1 | 3/2006 | Jansen |
| 2006/0284511 | A1* | 12/2006 | Evon et al. .............. 310/216 |
| 2008/0265585 | A1 | 10/2008 | Torres Martinez |
| 2009/0026771 | A1* | 1/2009 | Bevington et al. .......... 290/55 |
| 2009/0224544 | A1* | 9/2009 | Bartlett .................. 290/52 |
| 2010/0289348 | A1* | 11/2010 | Gruendl et al. ............ 310/54 |
| 2012/0049535 | A1 | 3/2012 | Versteegh |

FOREIGN PATENT DOCUMENTS

| | | |
|---|---|---|
| EP | 1641102 | 3/2006 |
| EP | 1988282 | 11/2008 |
| FR | 2793084 | 11/2000 |
| GB | 573773 | 12/1945 |
| JP | 58192453 | 11/1983 |
| JP | 60204236 | 10/1985 |
| WO | WO 00/74214 | 12/2000 |
| WO | WO 02/095222 | 11/2002 |
| WO | WO 2009/091248 | 7/2009 |
| WO | WO 2009091248 A2 * | 7/2009 |

OTHER PUBLICATIONS

Official Search of the European Patent Office in counterpart foreign priority application No. NL1036733 filed Mar. 19, 2009.
Official Search Report and Written Opinion of the European Patent Office for foreign application No. PCT/NL2010/0000049 filed Mar. 19, 2010.
Official Search of the European Patent Office for foreign application No. NL1036821 filed Apr. 6, 2009.

* cited by examiner

WIND TURBINE AND A DIRECT-DRIVE GENERATOR

CROSS-REFERENCE TO RELATED APPLICATION

This application is a Section 371 National Stage Application of International Application PCT/NL2010/000048 filed Mar. 19, 2010 and published as WO/2010/107305 in English.

BACKGROUND

The discussion below is merely provided for general background information and is not intended to be used as an aid in determining the scope of the claimed subject matter.

Aspects of the present invention relate to a wind turbine of the horizontal axis, direct-drive type, wherein the wind turbine comprises
 a hub provided with one or more blades,
 a generator with a centerline that is technically horizontal, the generator comprising an inner rotor which is driven by the hub and an outer stator, the stator comprising a front plate, a back plate and stacked, arcuate laminates.

There is a trend toward larger and larger wind turbines. A major problem designing larger wind turbines is the way power and weight scale. A hypothetical doubling of the length of the rotor diameter of a wind turbine will square its output, but increase its weight with a power of three. An increase in weight has a detrimental effect, in that it increases cost tremendously. This has an adverse effect on the cost of the electricity produced with the wind turbine. Thus, there is a major challenge to design a wind turbine that is both strong and light (for its size).

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

A wind turbine according to an aspect of the present invention includes a front plate and a back plate that are connected by tension rods so as to form a stator unit with the stacked, arcuate laminates being sandwiched between the back plate and the front-plate under compression. The arcuate laminates have protrusions over the circumference of the stator for dissipating heat to the atmosphere.

A major saving in weight is achieved by eliminating the shell, allowing the heat from the generator to dissipate into the atmosphere via the protrusions on the convex side of the arcuate laminates. The arcuate laminates provide for the structural integrity of the generator, more specifically of the stator. In general, one of the front plate and the back plate, usually the back plate, will be provided directly or indirectly (usually via a carrier cone) with one or more bearings, an outer bearing of which is connected to the rotor of the generator. Direct-drive generators tend to have a very large diameter. For this reason, the laminates are generally arcuate segments placed end-to-end. Generally, the laminate segments will independently be of a size of 360°/n where n is an integer≥2. They are generally placed staggered (i.e. overlapping) with respect to each other to provide the greatest mechanical strength. The stack will usually be impregnated with a resin, for example using vacuum pressure impregnation. pregnation. U.S. Pat. No. 6,467,725 in the name of Lucas Industries Ltd discloses an electrical generator for use with a gas turbine, the rotor of which comprises a stack of laminations held under compressive load. It is mentioned that it is advantageous if the stator is made of laminates as well. Laminates, or laminations as they are also called, are quite thin, such as in the order of 0.2 mm. The term "technically horizontal" means that the centerline of the generator makes an angle with the horizontal of up to +15°, in practice usually +4-8°.

According to one embodiment, the protrusions of stacked adjacent laminate segments are in register, forming ribs.

Such a wind turbine is cheaper because the generator is cheaper thanks to the use of the majority of the laminate segments being identical.

According to one embodiment, the outer surface of the stator is covered with a water-impermeable protective coating.

This helps to ensure the longevity of the generator, which is especially important for placement of wind turbines at sea, where the cost of maintenance is very high.

According to one embodiment, the arcuate segments have at least one through-hole, and the tension rods pass through the through-holes.

This allows for a very rigid stator structure.

According to one embodiment, the back plate has a sandwich structure.

This brings the weight of the generator even further down.

According to one embodiment, the centerline of the generator is at an angle of >2° to the horizontal.

This helps to ensure that water runs of the outside of the stator, improving the longevity of the generator and reducing the cost of maintenance.

An aspect of the present invention also relates to a direct-drive generator comprising an inner rotor and an outer stator, the stator comprising a front plate, a back plate and stacked, arcuate laminates, wherein the front plate and the back plate are connected by tension rods so as to form a stator unit with the stacked arcuate laminates being sandwiched between the back plate and the front-plate under compression, the arcuate laminates having protrusions over the circumference of the stator for dissipating heat.

This generator is very suitable for wind turbines or other open-air applications.

BRIEF DESCRIPTION OF THE DRAWINGS

Aspects of the invention will now be illustrated with reference to the drawing, wherein.

DETAILED DESCRIPTION OF THE ILLUSTRATIVE EMBODIMENTS

Figure 1:
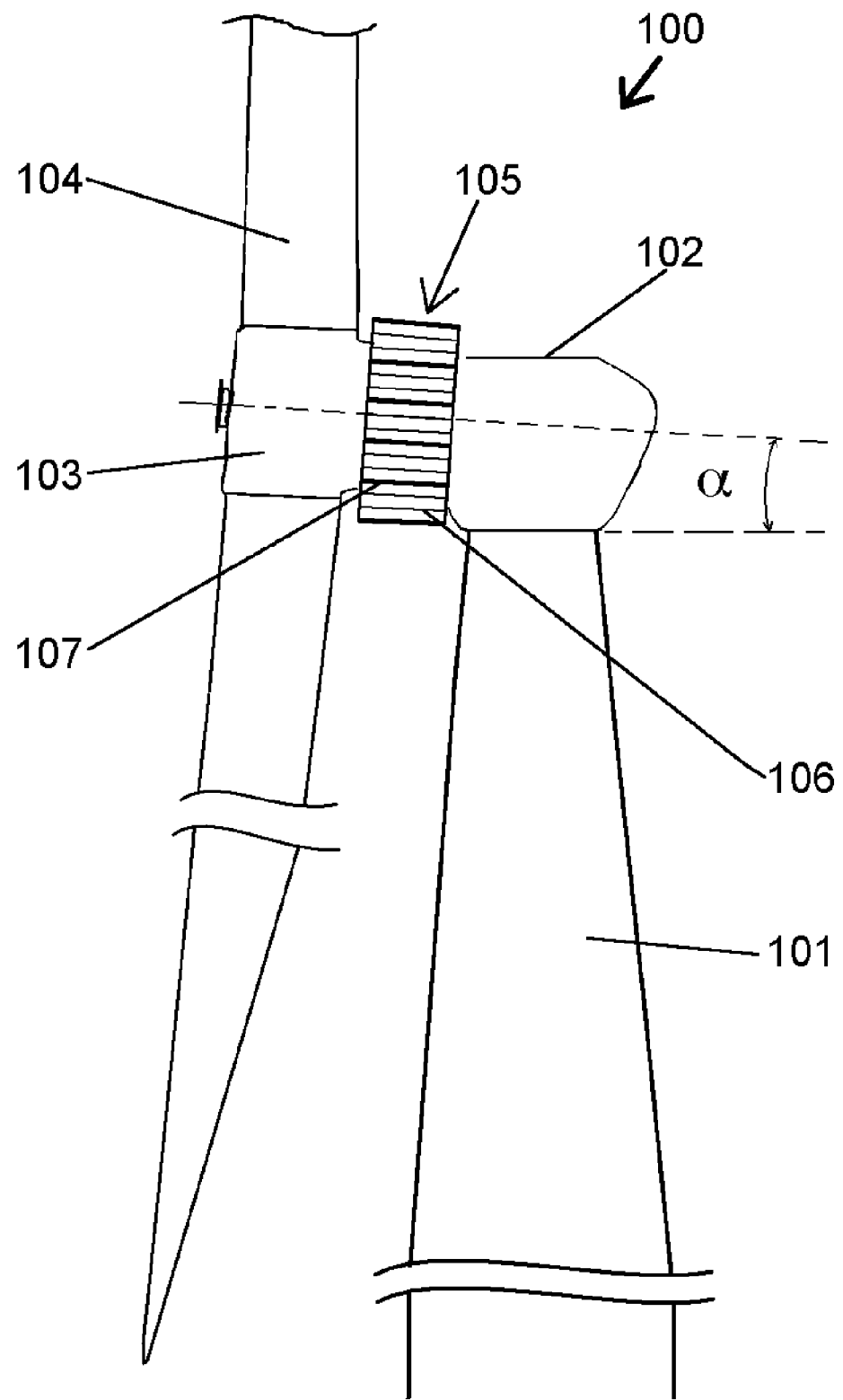
FIG. 1 shows the top part of a wind turbine.

FIG. 1 shows a wind turbine 100 with a tower 101, a nacelle 102, a hub 103 and blades 104. The nacelle 102 comprises a direct drive generator 105 with cooling ribs 106 and strengthening ribs 107. The hub 103 and generator 105 are at an angle of 6° to the horizontal, allowing any rainwater falling on the generator 105 to be drained easily.

Figure 2:
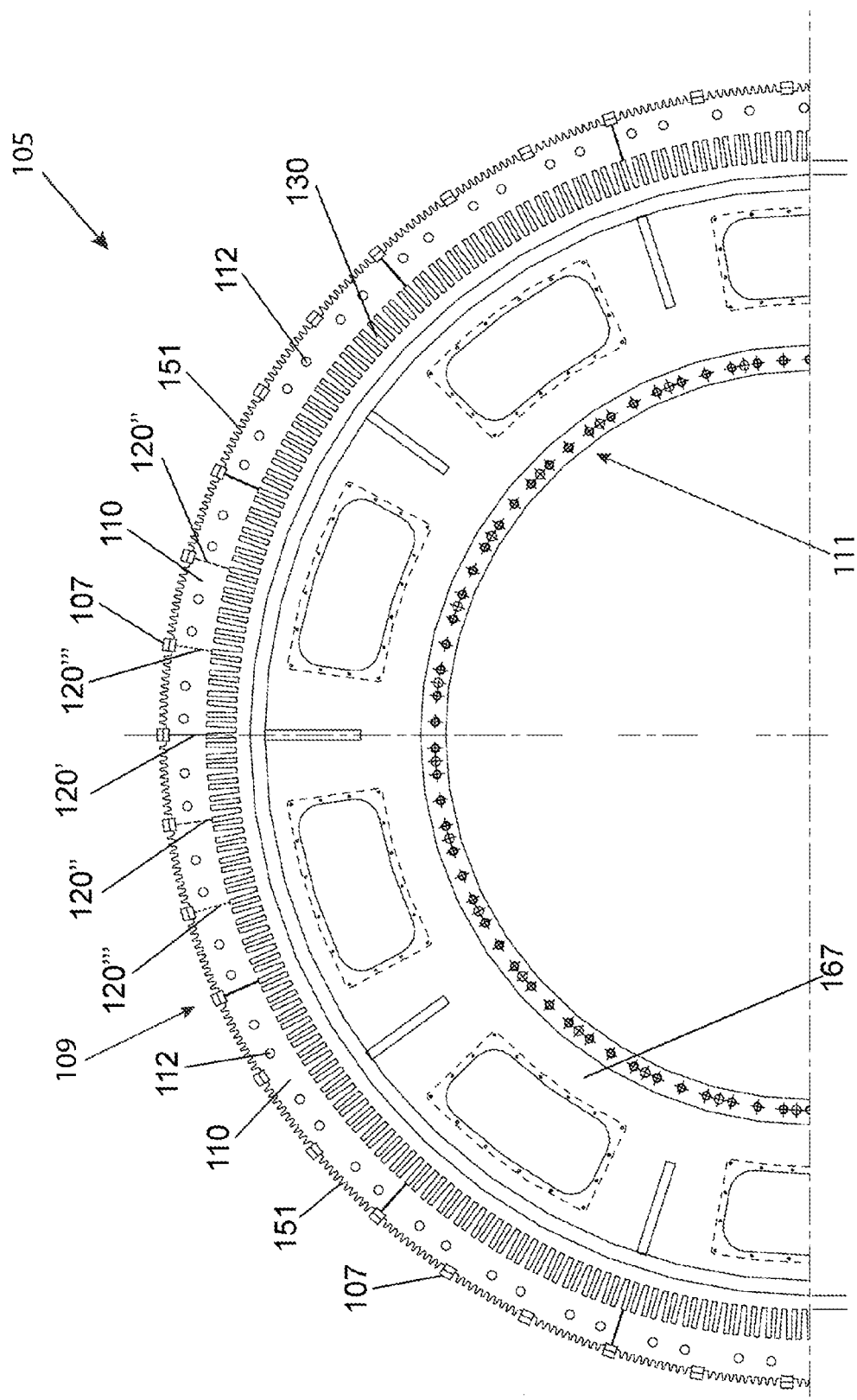
FIG. 2 shows a frontal cross-sectional view of the top half of a direct drive generator.

FIG. 2 shows a cross-sectional view of the top half of the generator 105 with the rotor 109 and stator 111 of the generator 105. Permanent magnets (not shown here but indicated in FIG. 3) of the rotor 109 face arcuate laminates 110 of the stator 111. The arcuate laminates 110 are made of a ferrometal and have a thickness of 0.6 mm (the thickness is shown exaggerated in FIG. 3). The arcuate laminates 110 have through-holes 112 for tension rods, as will be explained later. Not visible in FIG. 2 (but visible in FIG. 3) is that the arcuate laminates are provided as a stack of arcuate laminates 110. In the stack, the end-to-end region of two arcuate laminates are covered by another arcuate laminate. An arcuate laminate 110 overlaps with 2 arcuate laminates behind it; with one of the two for ⅔rd of its length, and for the remainder with the other arcuate laminate. The end-to-end regions of the visible arcuate laminates 110 are indicated with 120'; the end-to-end regions of arcuate laminates behind these visible arcuate laminates are indicated with reference number 120", and the end-to-end regions of the arcuate laminates behind these are indicated with reference number 120'". The through-holes 112 of adjacent laminates of the stack are in register so as to allow the tension rods to pass through the full stack of arcuate laminates 110.

FIG. 2 shows the teeth 130 of the arcuate laminates 110 in which the copper windings (not shown) are inserted. More importantly, it shows the protrusions 151 over the outer circumference of the stator 111 for dissipating heat to the atmosphere. The protrusions 151 of stacked arcuate laminates 110 form the cooling ribs 106 of the generator 105.

There are also strengthening ribs 107 provided over the circumference of the generator 105, which cover the end-to-end regions (120) of the arcuate laminates 110 to help ensure that no moisture enters the generator 105. They are welded over their full length to the stator 111 (before being impregnated with resin).

The outside of the generator 105, more specifically the stator 111 is coated with a weather-resistant and in particular moisture-impermeable coating. This can be done in accordance to well-established ISO standards, in particular those for Class 5 protection in marine environments, which offer protection for 20 years and more. Here, the stator is provided with Thermally Sprayed Aluminium, a coating well-known for components used in the off-shore industry. If desired, a sealant may be applied on top of the TSA layer for even better protection against corrosion.

Figure 3:
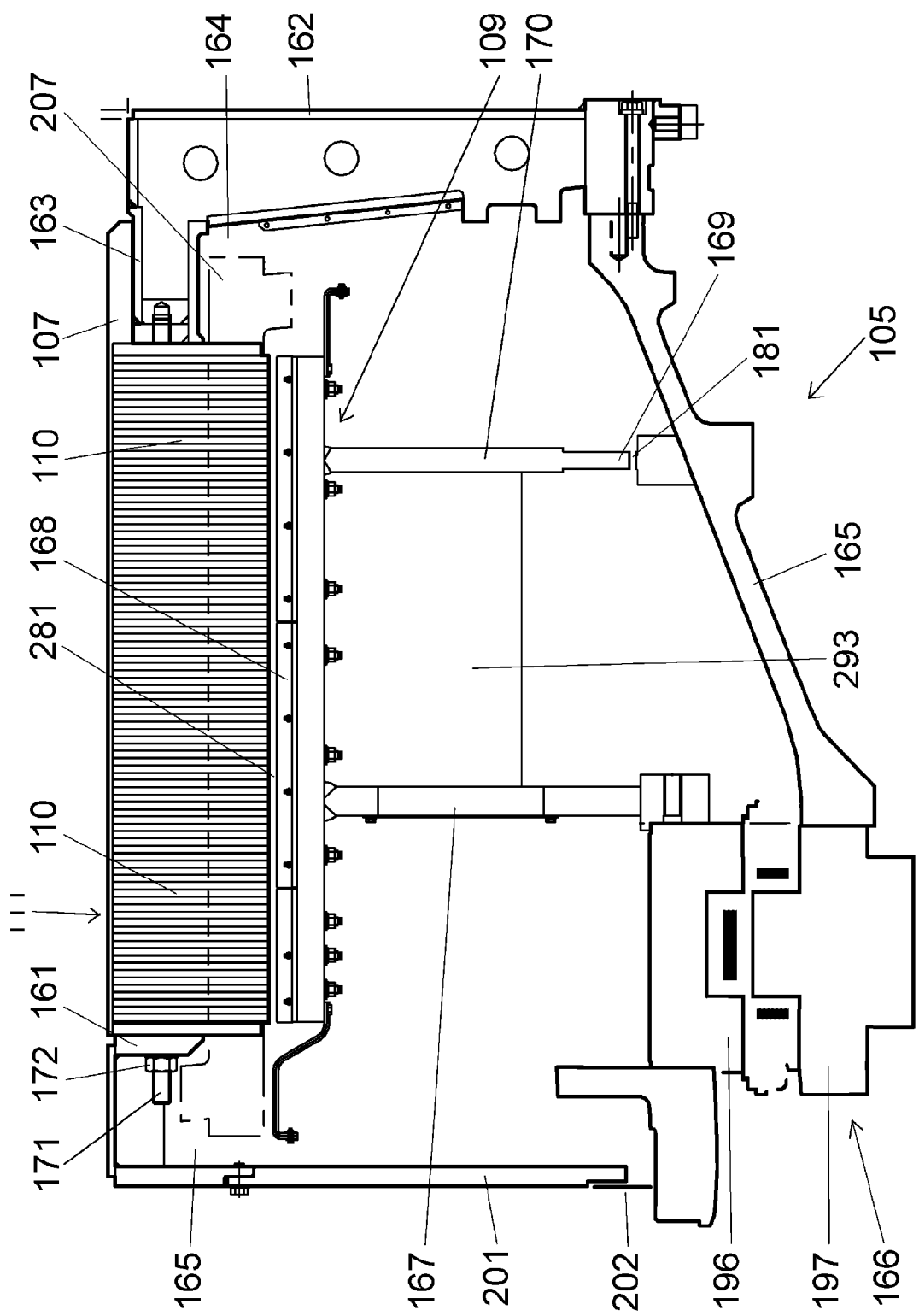
FIG. 3 shows a cross-sectional view of a detail of a generator.

FIG. 3 shows part of the stator 111, and in particular a section of the stack of arcuate laminates 110 under compression between a front plate 161 and a back plate 162. A threaded tension rod 171 is with its threaded end inserted in a threaded hole of the back plate 162, and at the other end of the tension rod 171 a nut 172 has been provided. Hydraulic pressure is applied to the tension rod 171 while the nut 172 is being tightened.

The back plate 162 has a sandwich structure and more specifically a nose 163 to create room (circular space 164) for the end turns of the copper windings 207 around the teeth 130 shown in FIG. 2 (this figure doesn't show the windings 207 but this is well known to the person skilled in the art). Also at the front end there is a circular space 165 for this purpose.

The back plate 162 is rigidly connected to a carrier cone 165, which in turn is rigidly connected with the inner bearing ring 197 of a bearing 166 (schematically shown). The outer bearing ring 196 of the bearing 166 is rigidly connected to a first rotor flange 167. To ensure rigidity of the rotor 109, there is a second flange 170 parallel to the first rotor flange 167 that is connected to the second rotor flange 170 by a stiffening plate 293. At its outer circumference, the rotor 109 is provided with magnets 168. The inner circumference of the second flange 197 is used as an annular brake disk 169 (braking callipers not shown). There is an air gap at 181 between the inner circumference of the annular break disk 169 and the carrier cone 165. The rotor 109 and the stator 111 are separated by a small air gap 281

The gap 211 between housing member 201 and the bearing section 166 is preferably provided with a seal 202, as is known in the art.

While several components of the generator 105 have been discussed, and steps in the manufacture thereof have been indicated (such as creating the stack of arcuate laminates), it is remarked that both these components and these steps are known. The invention differs in the presence of the arcuate laminations having protrusions for direct cooling of the stator to the atmosphere. generator.

The invention claimed is:

1. A wind turbine of the horizontal axis, direct-drive type, wherein the wind turbine comprises:
a hub provided with one or more blades, and
a generator configured to mount to a tower with a centerline that makes an angle with the horizontal of up to +15°, the generator comprising an inner rotor which is driven by the hub and an outer stator, the stator comprising a front plate, a back plate and stacked, arcuate laminate layers, each arcuate laminate layer comprising a plurality of arcuate laminate segments arranged end-to-end, wherein the arucate laminate segments of each arcaute laminate layer are independently of a size of 360°/n where n is an integer>=2, wherein each arcuate laminate layer includes a plurality of ribs, each rib being disposed to cover end-to-end regions of a pair of associated arcuate laminate segments, each rib configured to inhibit moisture from entering the generator through the end-to-end arrangement of the associated arcuate laminate segments, wherein the end-to-end arrangement of arcuate laminate segments of one arcuate laminate layer is staggered with respect to the end-to-end arrangement of arcuate laminate segments of other arcuate laminate layers about a centreline of the generator, and wherein the front plate and the back plate are connected by tension rods so as to form a stator unit with the stacked, arcuate laminate segments being sandwiched between the back plate and the front-plate under compression, the arcuate laminate segments having protrusions over the circumference of the stator for dissipating heat to the atmosphere.

2. The wind turbine according to claim 1, wherein protrusions of stacked adjacent arcuate laminate segments along the centreline are in register, forming ribs.

3. The wind turbine according to claim 1, wherein each arcuate laminate segment has at least one through-hole, and the tension rods pass through the through-holes.

4. The wind turbine according to claim 1, wherein the back plate has a sandwich structure.

5. The wind turbine according to claim 4, wherein the sandwich structure has a nose.

6. The wind turbine according to claim 1, wherein the centerline of the generator is at an angle of >2° to the horizontal.

7. A direct-drive generator comprising an inner rotor and an outer stator about a centerline, the stator comprising a front plate, a back plate and stacked arcuate laminate layers, wherein each arcuate laminate layer comprises a plurality of arcuate laminate segments arranged end-to-end about the centerline, wherein each arcuate laminate layer includes a plurality of ribs, each rib being disposed to cover end-to-end regions of a pair of associated arcuate laminate segments, each rib configured to inhibit moisture from entering the generator through the end-to-end arrangement of the associated arcuate laminate segments, wherein the front plate and the back plate are connected by tension rods so as to form a stator unit with the stacked arcuate laminate segments being sandwiched between the back plate and the front-plate under compression, the arcuate laminate segments having protrusions over the circumference of the stator for dissipating heat.

8. The direct-drive generator according to claim 7, wherein protrusions of stacked adjacent arcuate laminate segments along the centerline are in register, forming ribs.

9. The direct-drive generator according to claim 7, wherein each arcuate laminate segment has at least one through-hole, and the tension rods pass through the through-holes.

10. The direct-drive generator according to any of claim 7, wherein the back plate has a sandwich structure.

11. The direct-drive generator according to claim 7, wherein the sandwich structure has a nose.

12. The direct-drive generator according to claim 7, wherein the centerline of the generator is at an angle of >2° to the horizontal.

13. The direct-drive generator according to claim 7 wherein the end-to-end arrangement of arcuate laminate segments about the centreline of one arcuate laminate layer is staggered with respect to the end-to-end arrangement of arcuate laminate segments about the centreline of another arcuate laminate layer.

14. The wind turbine according to claim 1 wherein the end-to-end arrangement of arcuate laminate segments about the centreline of one arcuate laminate layer is staggered with respect to the end-to-end arrangement of arcuate laminate segments about the centreline of another arcuate laminate layer such that the end-to-end arrangement of arcuate laminate segments of said one arcuate laminate layer do not align with the end-to-end arrangement of arcuate laminate segments of an adjacent arcuate laminate layer.

15. The direct-drive generator according to claim 13 wherein each rib is joined to arcuate laminate segments of a plurality of arcuate laminate layers extending along a length of the stator.

16. The direct drive generator according to claim 15 wherein each rib is fixedly joined to a plurality of arcuate laminate segments over a plurality of arcuate laminate layers.

17. The wind turbine according to claim 1 wherein arcuate laminate segments of said one arcuate laminate layer cover end-to-end arrangements of arcuate laminate segments of an arcuate laminate layer adjacent to said one arcuate laminate layer.

* * * * *